United States Patent
Chen et al.

(10) Patent No.: US 10,299,217 B2
(45) Date of Patent: *May 21, 2019

(54) METHOD FOR ENSURING PARALLEL DATA RANDOM ACCESS AND USER EQUIPMENT

(71) Applicant: Huawei Technologies Co., Ltd., Shenzhen (CN)

(72) Inventors: Yuhua Chen, Shenzhen (CN); Qinghai Zeng, Shanghai (CN); Junren Chang, Beijing (CN); Jian Zhang, Beijing (CN); Guanglin Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,141

(22) Filed: Feb. 3, 2017

(65) Prior Publication Data

US 2017/0150453 A1    May 25, 2017

Related U.S. Application Data

(63) Continuation of application No. 14/088,064, filed on Nov. 22, 2013, now Pat. No. 9,596,703, which is a
(Continued)

(30) Foreign Application Priority Data

Sep. 26, 2011 (CN) .......................... 2011 1 0288396

(51) Int. Cl.
*H04W 52/14* (2009.01)
*H04W 72/04* (2009.01)
(Continued)

(52) U.S. Cl.
CPC ......... *H04W 52/146* (2013.01); *H04W 52/30* (2013.01); *H04W 72/0413* (2013.01);
(Continued)

(58) Field of Classification Search
CPC ............... H04W 52/146; H04W 52/30; H04W 74/0833; H04W 72/0413
See application file for complete search history.

(56) References Cited

U.S. PATENT DOCUMENTS 8,169,957 B2 * 5/2012 Damnjanovic ... H04W 52/0216
370/318
8,687,541 B2 * 4/2014 Lohr ..................... H04L 5/0007
370/318
(Continued)

FOREIGN PATENT DOCUMENTS

CN      101489254 A      7/2009
CN      101911543 A      12/2010
(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10.2.0, Jun. 2011, 54 pages.
(Continued)

*Primary Examiner* — Rasheed Gidado
(74) *Attorney, Agent, or Firm* — Slater Matsil, LLP (57) ABSTRACT

A method for ensuring parallel data random access and a user equipment are provided. An embodiment of the present invention includes controlling a random access sequence transmitted by a user equipment through a physical random access channel (PRACH) not to be sent with other uplink transmission in the same subframe, or, when a random access sequence transmitted by a user equipment through a PRACH is sent with other uplink transmission in the same subframe, controlling a priority of power transmission of the PRACH and a priority of power transmission of an uplink
(Continued)

| User equipment | | Network side |
|---|---|---|
| | MSG1、Random access sequence → | |
| | ← MSG2、Random access response | |
| | MSG3 → | |
| | ← MSG4、Contention resolution message | | channel over which the other uplink transmission is performed, when power is limited.

18 Claims, 1 Drawing Sheet

Related U.S. Application Data continuation of application No. PCT/CN2012/082063, filed on Sep. 26, 2012.

(51) Int. Cl.
*H04W 74/08* (2009.01)
*H04W 52/30* (2009.01)

(52) U.S. Cl.
CPC .... *H04W 74/0833* (2013.01); *H04W 74/0866* (2013.01); *Y02D 70/00* (2018.01); *Y02D 70/1262* (2018.01)

(56) References Cited

U.S. PATENT DOCUMENTS

| | | | |
|---|---|---|---|
| 9,008,050 B2 * | 4/2015 | Feuersanger | H04W 52/281 370/336 |
| 2009/0186613 A1 | 7/2009 | Ahn et al. | |
| 2009/0203323 A1 | 8/2009 | Ratasuk et al. | |
| 2010/0296467 A1 * | 11/2010 | Pelletier | H04W 74/002 370/329 |
| 2011/0044181 A1 | 2/2011 | Suo et al. | |
| 2012/0057547 A1 | 3/2012 | Löhr et al. | |
| 2012/0127931 A1 * | 5/2012 | Gaal | H04L 1/1861 370/329 |
| 2012/0213192 A1 | 8/2012 | Kiyoshima et al. | |
| 2012/0300715 A1 * | 11/2012 | Pelletier | H04W 56/0005 370/329 |
| 2013/0010711 A1 | 1/2013 | Larsson et al. | |
| 2013/0058315 A1 * | 3/2013 | Feuersanger | H04W 52/281 370/336 |
| 2013/0195048 A1 | 8/2013 | Ekpenyong et al. | |
| 2013/0250925 A1 | 9/2013 | Löhr et al. | |
| 2014/0029586 A1 | 1/2014 | Löhr et al. | |
| 2014/0092842 A1 | 4/2014 | Ahn et al. | |
| 2014/0348078 A1 * | 11/2014 | Kim | H04W 52/146 370/329 |
| 2016/0227505 A1 | 8/2016 | Löhr et al. | |

FOREIGN PATENT DOCUMENTS

| | | |
|---|---|---|
| CN | 102918896 A | 2/2013 |
| EP | 2214450 A2 | 8/2010 |
| EP | 2477436 A1 | 7/2012 |
| JP | 2013529403 A | 7/2013 |
| JP | 2013545329 A | 12/2013 |
| JP | 2014511640 A | 5/2014 |
| WO | 2010002301 A1 | 1/2010 |
| WO | 2010121708 A1 | 10/2010 |
| WO | 2011030759 A1 | 3/2011 |
| WO | 2011099478 A1 | 8/2011 |

OTHER PUBLICATIONS

3rd Generation Partnership Project; Technical Specification Group Radio Access Network; Evolved Universal Terrestrial Radio Access (E-UTRA); Physical layer procedures (Release 10), Sep. 2011, 3GPP TS 36.213 V10.3.0; 122 pages.

3rd Generation Partnership Project; Technical Specification Group Radio Access Network; Evolved Universal Terrestrial Radio Access (E-UTRA); Services provided by the physical layer (Release 10), 3GPP TS 36.302 V10.2.0, Jun. 2011, 19 pages.

Panasonic, "RACH on SCell for supporting Multiple Timing Advance," 3GPP TSG-RAN WG2 Meeting #74, R2-112806, May 9-13, 2011, Barcelona, Spain, 2 pages.

\* cited by examiner

METHOD FOR ENSURING PARALLEL DATA RANDOM ACCESS AND USER EQUIPMENT

CROSS-REFERENCE TO RELATED APPLICATIONS

This application is a continuation of U.S. patent application Ser. No. 14/088,064, filed on Nov. 22, 2013, which is a continuation of International Application No. PCT/CN2012/082063, filed on Sep. 26, 2012, which claims priority to Chinese Patent Application No. 201110288396.0, filed on Sep. 26, 2011. All of the afore-mentioned patent applications are hereby incorporated by reference in their entireties.

TECHNICAL FIELD

The present invention relates to the field of communications technologies, and in particular, to a method for ensuring parallel data random access and a user equipment.

BACKGROUND

A random access procedure is a basic function in LTE (long term evolution system). Only after a user equipment is synchronized with an uplink of a system through the random access procedure can the user equipment be scheduled by the system to perform uplink transmission (for example, transmission of uplink data or transmission of uplink control information). Random access in the LTE is classified into two forms, that is, contention-based random access (that is, a network side does not assign a dedicated random access sequence to the user equipment) and non-contention random access.

Figure 1:
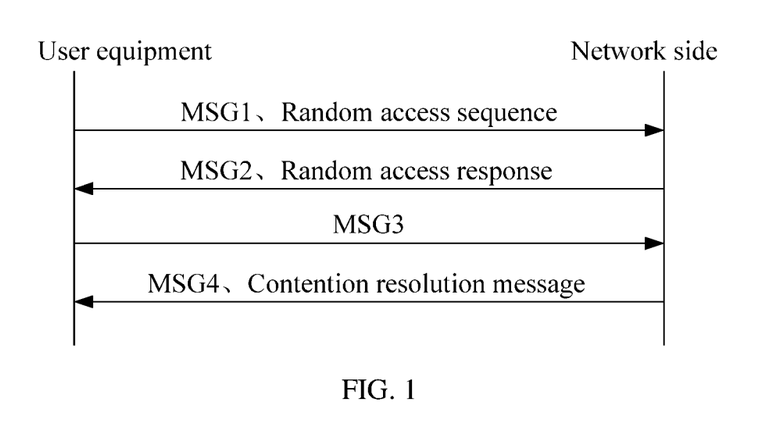
FIG. 1 is a flow chart of a contention-based random access procedure in the prior art.

As shown in FIG. 1, a contention-based random access procedure includes the following four steps.

First step (MSG1): A user equipment sends random access sequences (random access preamble) selected by the user equipment to a network side over a PRACH (physical random access channel) selected by the user equipment. The random access sequences are divided by the network side into a group A and a group B, and according to the size of a message required to be sent and the loss of a current downlink path of the user equipment, the user equipment decides whether to select and send a random access sequence in the group A or select and send a random access sequence in the group B.

Second step (MSG2): The network side sends a random access response to the user equipment. The random access response includes an index number of a detected preamble sequence, time adjustment information used for uplink synchronization, an initial uplink resource assignment (used for sending a subsequent MSG3) and a temporary C-RNTI (Cell-RNTI, serving cell-radio network temporary identifier, where it is decided whether the temporary C-RNTI is to be converted into a permanent C-RNTI in an MSG4). The user equipment needs to receive the corresponding MSG2 (the random access response) through interception on a PDCCH (physical downlink control channel) scrambled by an RA-RNTI (random access-radio network temporary identifier).

Though the user equipment intercepts the MSG2, because the MSG1 sent by the user equipment is randomly selected from public resources, it is possible that different user equipments send the same MSG1 (random access sequence) over a PRACH resource of the same time and frequency, so that the user equipment needs to solve this random access contention through subsequent MSG3 and MSG4 (a contention resolution message).

Third step (MSG3): The user equipment sends the MSG3 to the network side. The content of the MSG3 is not limited. The MSG3 sometimes may carry an RRC (radio resource control protocol) connection request and sometimes may carry some control information or service data packets, and sometimes, to distinguish different user equipments, the MSG3 may also carry a specific ID of the user equipment. The MSG3 is a message transmitted over a PUSCH (physical uplink shared channel).

Fourth step (MSG4): The network side sends, to the user equipment, a contention resolution message (Contention Resolution). If a user equipment ID carried in the contention resolution message received by the user equipment matches with the specific ID of the user equipment sent by the user equipment in the MSG3, or a carried contention detection identifier matches with the RRC sent by the user equipment in the MSG3, the random access succeeds.

Figure 2:
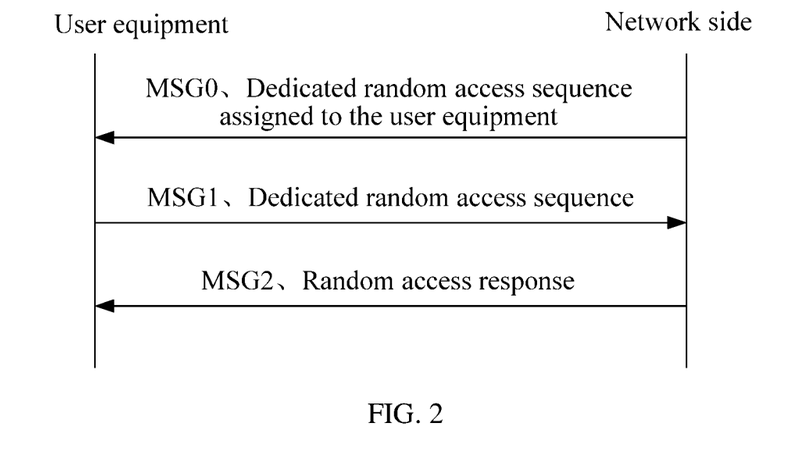
FIG. 2 is a flow chart of a non-contention random access procedure in the prior art.

Similar to the contention-based random access procedure, as shown in FIG. 2, a non-contention random access procedure includes the following. First, a network side assigns, to a user equipment, a dedicated random access sequence, and the network side sends, to the user equipment, random access sequence assignment (Random Access Preamble assignment), that is, an MSG0. Next, the user equipment sends, to the network side over a selected PRACH, the dedicated random access sequence, that is, an MSG1, assigned to the user equipment. Finally, the network side sends a random access response, that is, an MSG2, to the user equipment. If the user equipment receives the random access response, the random access succeeds.

After the random access succeeds, the user equipment performs uplink data transmission. When the total power demanded for the uplink data transmission is greater than a maximum power transmission capability of the user equipment, that is, when power is limited, transmission power needs to be scaled. Priorities of power transmission of uplink channels when the power is limited are that a priority of a PUSCH transmission over which does not include UCI (uplink control information) is lower than a priority of a PUSCH transmission over which includes the UCI, and the priority of the PUSCH transmission over which includes the UCI is lower than a priority of a PUCCH (physical uplink control channel).

The current random access procedure is applicable to a situation in which when multiple uplink carriers in carrier aggregation pass through the same path, all the carriers share the same timing advance. The random access procedure is only initiated in a primary serving cell, and in the random access procedure, a situation of other uplink transmission does not exist.

However, when the uplink carriers in the carrier aggregation pass through different paths, all the carriers no longer share the same timing advance, the random access procedure needs to be initiated in an auxiliary serving cell, and meanwhile, other uplink transmission may exist on another synchronized carrier (for example, uplink data transmission is performed in the primary serving cell while a random access procedure is performed in an auxiliary serving cell to obtain the timing advance used in uplink synchronization). At this time, the contention between the uplink data transmission and the random access procedure may occur in the current random access procedure.

SUMMARY

Embodiments of the present invention provide a method for ensuring parallel data random access and a user equipment, which avoid contention between other uplink transmission and a random access procedure.

One aspect of the present invention provides a method for ensuring parallel data random access, which includes controlling a random access sequence transmitted by a user equipment through a physical random access channel PRACH not to be sent in the same subframe with other uplink transmission, or when a random access sequence transmitted by a user equipment through a PRACH is sent in the same subframe with other uplink transmission, controlling a priority of power transmission of the PRACH and a priority of power transmission of an uplink channel over which the other uplink transmission is performed, when power is limited.

Another aspect of the present invention further provides a user equipment, which includes a control unit, configured to control a random access sequence transmitted by the user equipment through a physical random access channel PRACH not to be sent in the same subframe with other uplink transmission, or includes a power control unit, configured to, when a random access sequence transmitted by the user equipment through a PRACH is sent in the same subframe with other uplink transmission, control a priority of power transmission of the PRACH and a priority of power transmission of an uplink channel over which the other uplink transmission is performed, when power is limited.

As can be seen from technical solutions provided by the embodiments of the present invention, it is implemented that transmission of the random access sequence and other uplink transmission are controlled to be successively performed, or it is implemented that transmission of the random access sequence and other uplink transmission are controlled to be simultaneously performed, which avoids contention between uplink transmission and a random access procedure in a parallel data random access procedure.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

The technical solutions of the present invention are clearly and fully described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

An embodiment of the present invention provides a method for ensuring parallel data random access, which includes controlling a random access sequence transmitted by a user equipment through a PRACH not to be sent in the same subframe with other uplink transmission.

Further, the method is applicable to a situation in which the PRACH and a PUCCH/PUSCH are in the same subframes of different carriers. When the uplink channel over which the other uplink transmission is performed includes a PUCCH and a PUSCH, a priority of the PRACH, a priority of the PUCCH and a priority of the PUSCH are controlled, so as to implement successive transmission of the random access sequence and the other uplink transmission.

Specifically, the priority of the PRACH is controlled to be lower than the priority of the PUCCH and the priority of the PUSCH, so that when a PRACH subframe for transmitting the random access sequence is selected, a subframe in which uplink transmission needs to be performed through the PUCCH and the PUSCH is not selected.

Or, specifically, the priority of the PRACH is controlled to be higher than the priority of the PUCCH and the priority of the PUSCH, so that when uplink transmission performed through the PUCCH and the PUSCH exists in a selected subframe in which the PRACH for transmitting the random sequence lies, the uplink transmission performed through the PUCCH and the PUSCH is cancelled.

Or, specifically, the priority of the PRACH is controlled to be higher than that of the PUSCH but lower than that of the PUCCH, so that when a PRACH subframe for transmitting the random access sequence is selected, a subframe in which uplink transmission needs to be performed through the PUCCH is not selected, and when uplink transmission performed through the PUSCH exists in the selected subframe in which the PRACH for transmitting the random sequence lies, the uplink transmission performed through the PUSCH is cancelled.

An embodiment of the present invention provides another method for ensuring parallel data random access, which includes when a random access sequence transmitted by a user equipment through a PRACH is sent in the same subframe with other uplink transmission, controlling a priority of power transmission of the PRACH and a priority of power transmission of an uplink channel over which the other uplink transmission is performed, when power is limited.

Further, when the uplink channel over which the other uplink transmission is performed includes a PUCCH and a PUSCH, a priority of power transmission of the PRACH, a priority of power transmission of the PUCCH and a priority of power transmission of the PUSCH when power is limited are controlled, so as to implement control of simultaneous transmission of the random access sequence and the other uplink transmission.

Specifically, a priority of power transmission of a PUSCH transmission over which does not include uplink control information UCI is controlled to be lower than a priority of power transmission of a PUSCH transmission over which includes the UCI, the priority of power transmission of the PUSCH transmission over which includes the UCI is controlled to be lower than a priority of power transmission of the PRACH, and the priority of power transmission of the PRACH is controlled to be lower than a priority of power transmission of the PUCCH.

Or, specifically, a priority of power transmission of a PUSCH transmission over which does not include UCI is controlled to be lower than a priority of power transmission of a PUSCH transmission over which includes the UCI, the priority of power transmission of the PUSCH transmission over which includes the UCI is controlled to be lower than a priority of power transmission of the PUCCH, and the priority of power transmission of the PUCCH is controlled to be lower than a priority of power transmission of the PRACH.

Or, specifically, a priority of power transmission of a PUSCH transmission over which does not include UCI is controlled to be lower than a priority of power transmission of the PRACH, the priority of power transmission of the PRACH is controlled to be lower than a priority of power transmission of a PUSCH transmission over which includes the UCI, and the priority of power transmission of the PUSCH transmission over which includes the UCI is controlled to be lower than a priority of power transmission of the PUCCH.

Based on the two methods for ensuring parallel data random access provided by the above embodiment, the method may further include when the user equipment transmits an MSG3 to a network side through a PUSCH in a contention-based random access procedure, based on priorities of power transmission of uplink channels when existing power is limited, that is, the priority of power transmission of the PUSCH transmission over which does not include the UCI is lower than a priority of power transmission of the PUSCH transmission over which includes the UCI, and the priority of power transmission of the PUSCH transmission over which includes the UCI is lower than a priority of power transmission of the PUCCH, controlling a priority of power transmission of the PUCCH, a priority of power transmission of the PUSCH transmission over which does not include the UCI, a priority of power transmission of the PUSCH transmission over which includes the UCI, and a priority of power transmission of the PUSCH transmitting the MSG3, when the power is limited, so that transmission of the MSG3 in the random access procedure and the other uplink transmission are simultaneously performed.

Specifically, the priority of power transmission of the PUSCH transmission over which includes the UCI is controlled to be equal to the priority of power transmission of the PUSCH transmitting the MSG3. With reference to the priorities of uplink channels when existing power is limited, transmission of the MSG3 in the random access procedure and the other uplink transmission are enabled to be simultaneously performed.

Or, specifically, the priority of power transmission of the PUSCH transmission over which does not include the UCI is controlled to be lower than the priority of power transmission of the PUSCH transmission over which includes the UCI, the priority of power transmission of the PUSCH transmission over which includes the UCI is controlled to be lower than the priority of power transmission of the PUSCH transmitting the MSG3, and the priority of power transmission of the PUSCH transmitting the MSG3 is controlled to be lower than the priority of power transmission of the PUCCH, so that transmission of the MSG3 in the random access procedure and the other uplink transmission are simultaneously performed.

Or, specifically, the priority of power transmission of the PUSCH transmission over which does not include the UCI is controlled to be lower than the priority of power transmission of the PUSCH transmitting the MSG3, the priority of power transmission of the PUSCH transmitting the MSG3 is controlled to be lower than the priority of power transmission of the PUSCH transmission over which includes the UCI, and the priority of power transmission of the PUSCH transmission over which includes the UCI is controlled to be lower than the priority of power transmission of the PUCCH, so that transmission of the MSG3 in the random access procedure and the other uplink transmission are simultaneously performed.

Or, specifically, the priority of power transmission of the PUSCH transmission over which does not include the UCI is controlled to be lower than the priority of power transmission of the PUSCH transmission over which includes the UCI, the priority of power transmission of the PUSCH transmission over which includes the UCI is controlled to be lower than the priority of power transmission of the PUCCH, and the priority of power transmission of the PUCCH is controlled to be lower than the priority of power transmission of the PUSCH transmitting the MSG3, so that transmission of the MSG3 in the random access procedure and the other uplink transmission are simultaneously performed.

Further, when the user equipment transmits the MSG3 to the network side in the contention-based random access procedure, the MSG3 is transmitted through an assigned uplink resource in a received random access response.

The above method may also include when the contention-based random access procedure is initiated in an auxiliary serving cell, selecting and sending a random access sequence in a group A, or, according to the loss of a current downlink path of the auxiliary serving cell, selecting and sending a random access sequence in a group A or a group B.

Specifically, when the contention-based random access procedure is initiated in an auxiliary serving cell, generally a random access procedure has been completed in a primary serving cell and other uplink transmission is being performed, so the network side may learn a situation of a buffer of the network side through a parameter (for example, a buffer buffer state) carried during the uplink transmission performed in the primary serving cell. Therefore, the user equipment in the auxiliary serving cell does not need to consider the size of a message to be sent, and only needs to select and send a random access sequence in the group A or the group B according to the loss of the current downlink path or to directly select and send a random access sequence in the group A. In this way, the network side may assign minimum grants (grant) before contention detection.

Figure 3:
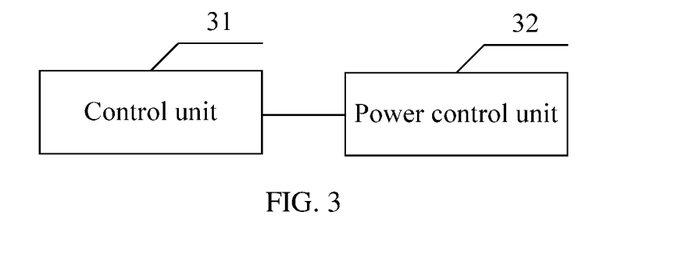
FIG. 3 is a schematic structural diagram of a user equipment according to an embodiment of the present invention.

An embodiment of the present invention also provides a user equipment. As shown in FIG. 3, the user equipment includes a control unit 31 or a power control unit 32.

The control unit 31 is configured to control a random access sequence transmitted by the user equipment through a physical random access channel PRACH not to be sent in the same subframe with other uplink transmission.

Further, when an uplink channel over which the other uplink transmission is performed includes a PUCCH and a PUSCH, the control unit 31 is configured to control a priority of the PRACH, a priority of the PUCCH and a priority of the PUSCH, so as to implement successive transmission of the random access sequence and the other uplink transmission.

Specifically, the control unit 31 is configured to control the priority of the PRACH to be lower than the priority of the PUCCH and the priority of the PUSCH, so that when a PRACH subframe for transmitting the random access sequence is selected, a subframe in which uplink transmission needs to be performed through the PUCCH and the PUSCH is not selected.

Or, specifically, the control unit 31 is configured to control the priority of the PRACH to be higher than the priority of the PUCCH and the priority of the PUSCH, so that when uplink transmission performed through the PUCCH and the PUSCH exists in a selected subframe in which the PRACH for transmitting the random sequence lies, the uplink transmission performed through the PUCCH and the PUSCH is cancelled.

Or, specifically, the control unit 31 is configured to control the priority of the PRACH to be higher than that of the PUSCH but lower than that of the PUCCH, so that when a PRACH subframe for transmitting the random access sequence is selected, a subframe in which uplink transmission needs to be performed through the PUCCH is not selected, and when uplink transmission performed through the PUSCH exists in the selected subframe in which the PRACH for transmitting the random sequence lies, the uplink transmission performed through the PUSCH is cancelled.

The power control unit 32 is configured to, when a random access sequence transmitted by the user equipment through a PRACH is sent in the same subframe with other uplink transmission, control a priority of power transmission of the PRACH and a priority of power transmission of an uplink channel over which the other uplink transmission is performed, when power is limited.

Further, when the uplink channel over which the other uplink transmission is performed includes a PUCCH and a PUSCH, the power control unit 32 is configured to control a priority of power transmission of the PRACH, a priority of power transmission of the PUCCH and a priority of power transmission of the PUSCH when the power is limited, so as to implement control of simultaneous transmission of the random access sequence and the other uplink transmission.

Specifically, the power control unit 32 is configured to control a priority of power transmission of a PUSCH transmission over which does not include uplink control information UCI to be lower than a priority of power transmission of a PUSCH transmission over which includes the UCI, the priority of power transmission of the PUSCH transmission over which includes the UCI to be lower than a priority of power transmission of the PRACH, and the priority of power transmission of the PRACH to be lower than a priority of power transmission of the PUCCH.

Or, specifically, the power control unit 32 is configured to control a priority of power transmission of a PUSCH transmission over which does not include UCI to be lower than a priority of power transmission of a PUSCH transmission over which includes the UCI, the priority of power transmission of a PUSCH transmission over which includes the UCI to be lower than a priority of power transmission of the PUCCH, and the priority of power transmission of the PUCCH to be lower than a priority of power transmission of the PRACH.

Or, specifically, the power control unit 32 is configured to control a priority of power transmission of a PUSCH transmission over which does not include UCI to be lower than a priority of power transmission of the PRACH, the priority of power transmission of the PRACH to be lower than a priority of power transmission of a PUSCH transmission over which includes the UCI, and the priority of power transmission of a PUSCH transmission over which includes the UCI to be lower than a priority of power transmission of the PUCCH.

When the user equipment transmits an MSG3 to a network side in a contention-based random access procedure, the user equipment may also include a transmitting unit, configured to transmit the MSG3 through an assigned uplink resource in a received random access response.

When the contention-based random access procedure is initiated in an auxiliary serving cell, the user equipment may also include a sending unit, configured to select and send a random access sequence in a group A, or, according to the loss of a current downlink path of the auxiliary serving cell, select and send a random access sequence in a group A or a group B.

The specific implementation manners of processing functions of the units included in the user equipment are described in the foregoing method embodiment, which are not described herein again.

It should be noted that, the units included in the above node embodiment are divided just according to logical functions, but the present invention is not limited to the division, as long as corresponding functions can be realized; the specific names of the functional units are merely provided for the purpose of distinguishing the units from one another, but not intended to limit the protection scope of the present invention.

Additionally, persons of ordinary skill in the art should understand that, all of or a part of the steps in the method according to the embodiments may be implemented by a program instructing relevant hardware. The corresponding program may be stored in a computer readable storage medium. The storage medium may be a read-only memory, a magnetic disk, or an optical disk.

In the embodiment of the present invention, the user equipment enables a random access sequence and other uplink transmission to be successively transmitted by controlling the random access sequence transmitted through a PRACH not to be sent in the same subframe with the other uplink transmission, or the user equipment enables a random access sequence and other uplink transmission to be simultaneously transmitted by controlling the priority of power transmission of a PRACH and the priority of power transmission of an uplink channel over which the other uplink transmission is performed, when power is limited, thereby avoiding contention between the other uplink transmission and the random access procedure. In addition, an MSG3 is transmitted through an assigned uplink resource in a received random access response in a contention-based random access procedure, which avoids the possibility that the user equipment obtains a wrong timing advance when the MSG3 is successfully sent in another synchronized cell, thereby ensuring the accuracy of contention detection in the random access procedure. Meanwhile, when the contention-based random access procedure is initiated by a user equipment in an auxiliary serving cell, the user equipment may directly select and send a random access sequence in a group A or select and send a random access sequence in a group A or a group B just according to the loss of a current downlink path, thereby saving a judgment process and achieving more accurate selection.

The above description is merely about exemplary embodiments of the present invention, but is not intended to limit the protection scope of the present invention. All variations or substitutions that can be easily figured out by persons skilled in the art within the technical scope of the present invention should fall within the protection scope of the present invention. Therefore, the protection scope of the present invention is subject to the protection scope of the claims.

What is claimed is:

1. A method comprising:
   transmitting, by a user equipment in a subframe, a random access sequence through a physical random access channel (PRACH) in an auxiliary serving cell; and
   transmitting, by the user equipment in the subframe, other uplink channels in a primary serving cell that is different from the auxiliary serving cell, wherein the other uplink channels comprise a physical uplink control channel (PUCCH) and a physical uplink shared channel (PUSCH) which does not comprise any uplink control information (UCI);

wherein, when power is limited, a priority of transmission power of the PRACH and a priority of transmission power of the other uplink channels are as follows:

the priority of transmission power of the PRACH transmitted in the auxiliary serving cell is higher than a priority of transmission power of the PUCCH transmission in the primary serving cell, and the priority of transmission power of the PUCCH transmission in the primary serving cell is higher than a priority of transmission power of the PUSCH transmission that does not comprise any UCI in the primary serving cell.

2. The method according to claim 1, further comprising:
transmitting, by the user equipment, a message 3 (MSG3) to a network side through a PUSCH in a contention-based random access procedure, wherein when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled by the user equipment;

wherein the priority of transmission power of the PUSCH transmission that comprises the UCI is controlled to be equal to the priority of transmission power of the PUSCH transmitting the MSG.

3. The method according to claim 1, further comprising:
transmitting, by the user equipment, a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled by the user equipment;

wherein the priority of transmission power of the PUSCH transmission that does not comprise any UCI is controlled to be lower than the priority of transmission power of the PUSCH transmission that comprises the UCI, the priority of transmission power of the PUSCH transmission that comprises the UCI is controlled to be lower than the priority of transmission power of the PUSCH transmitting the MSG3, and the priority of transmission power of the PUSCH transmitting the MSG3 is controlled to be lower than the priority of transmission power of the PUCCH.

4. The method according to claim 1, further comprising:
transmitting, by the user equipment, a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises the UCI, and a priority of transmission power of the PUSCH transmitting the MSG3 are controlled by the user equipment;

wherein the priority of transmission power of the PUSCH transmission that does not comprise any UCI is controlled to be lower than a priority of transmission power of the PUSCH transmitting the MSG3, the priority of transmission power of the PUSCH transmitting the MSG3 is controlled to be lower than a priority of transmission power of a PUSCH transmission comprising UCI, and the priority of transmission power of the PUSCH transmission comprising the UCI is controlled to be lower than the priority of transmission power of the PUCCH.

5. The method according to claim 1, further comprising:
transmitting, by the user equipment, a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled by the user equipment;

wherein the priority of transmission power of the PUSCH transmission that does not comprise any UCI is controlled to be lower than the priority of transmission power of the PUSCH transmission that comprises the UCI, the priority of transmission power of the PUSCH transmission that comprises the UCI is controlled to be lower than the priority of transmission power of the PUCCH, and the priority of transmission power of the PUCCH is controlled to be lower than the priority of transmission power of the PUSCH transmitting the MSG3.

6. The method according to claim 1, further comprising:
when the user equipment transmits a message 3 (MSG3) to a network side in a contention-based random access procedure, transmitting the MSG3 through an assigned uplink resource in a received random access response.

7. An apparatus, comprising:
a processor coupled with a non-transitory storage medium storing executable instructions, wherein the executable instructions, when executed by the processor, cause the apparatus to:
transmit, in a subframe, a random access sequence through a physical random access channel (PRACH) in an auxiliary serving cell; and
transmit, in the subframe, other uplink channels on a primary serving cell that is different from the auxiliary serving cell, wherein the other uplink channels comprise a physical uplink control channel (PUCCH) and a physical uplink shared channel (PUSCH) that does not comprise any uplink control information (UCI);

wherein, when power is limited, a priority of transmission power of the PRACH and a priority of transmission powers of the other uplink channels are as follows:

the priority of transmission power of the PRACH transmitted in the auxiliary serving cell is higher than a priority of transmission power of the PUCCH transmission in the primary serving cell, and the priority of transmission power of the PUCCH transmission in the primary serving cell is higher than a priority of transmission power of the PUSCH transmission that does not comprise any UCI in the primary serving cell.

8. The apparatus according to claim 7, wherein the executable instructions, when executed by the processor, further cause the apparatus to:

transmit a message 3 (MSG3) to a network side through a PUSCH in a contention-based random access procedure, wherein, when power is limited, a priority of transmission power of the PUCCH, a priority of transmission power of the PUSCH transmission that does not comprise any UCI, a priority of transmission power of a PUSCH transmission that comprises UCI, and a priority of transmission power of the PUSCH transmitting the MSG3 are controlled;

wherein the priority of transmission power of the PUSCH transmission that comprises the UCI is controlled to be equal to the priority of transmission power of the PUSCH transmitting the MSG3.

9. The apparatus according to claim 7, wherein the executable instructions, when executed by the processor, cause the apparatus further to:

transmit a message 3 (MSG3) to a network side through a PUSCH in a contention-based random access procedure, wherein when power is limited, the priority of the PUSCH transmission that does not comprise any UCI, a priority of transmission power of a PUSCH transmission that comprises UCI, and a priority of transmission power of the PUSCH transmitting the MSG3 are controlled;

wherein the priority of transmission power of the PUSCH transmission that does not comprise any UCI is controlled to be lower than the priority of transmission power of the PUSCH transmission that comprises UCI, the priority of transmission power of the PUSCH transmission that comprises the UCI is controlled to be lower than the priority of transmission power of the PUSCH transmitting the MSG3, and the priority of transmission power of the PUSCH transmitting the MSG3 is controlled to be lower than the priority of transmission power of the PUCCH.

10. The apparatus according to claim 7, wherein the executable instructions, when executed by the processor, further cause the apparatus to:

transmit a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled;

wherein the priority of transmission power of the PUSCH transmission that does not comprise the UCI is controlled to be lower than the priority of transmission power of the PUSCH transmitting the MSG3, the priority of transmission power of the PUSCH transmitting the MSG3 is controlled to be lower than the priority of transmission power of the PUSCH transmission that comprises the UCI, and the priority of transmission power of the PUSCH transmission that comprises the UCI is controlled to be lower than the priority of transmission power of the PUCCH.

11. The apparatus according to claim 7, wherein the executable instructions, when executed by the processor, further cause the apparatus to:

transmit a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled;

wherein the priority of transmission power of the PUSCH transmission that does not comprise any UCI is controlled to be lower than the priority of transmission power of the PUSCH transmission that comprises the UCI, the priority of transmission power of the PUSCH transmission over which comprises the UCI is controlled to be lower than the priority of transmission power of the PUCCH, and the priority of transmission power of the PUCCH is controlled to be lower than the priority of transmission power of the PUSCH transmitting the MSG3.

12. The apparatus according to claim 7, wherein the executable instructions, when executed by the processor, further cause the apparatus to:

transmit an MSG3 through an assigned uplink resource in a received random access response in a contention-based random access procedure.

13. A non-transitory computer-readable medium storing computer instructions that, when executed by one or more hardware processors, cause the one or more hardware processors to:

transmit, in a subframe, a random access sequence through a physical random access channel (PRACH) in an auxiliary serving cell; and transmit, in the subframe, other uplink channels in a primary serving cell that is different from the auxiliary serving cell, wherein the other uplink channels comprise a physical uplink control channel (PUCCH) and a physical uplink shared channel (PUSCH) that does not comprise any uplink control information (UCI);

wherein, when power is limited, a priority of transmission power of the PRACH and a priority of transmission power of the other uplink channels are as follows:

the priority of transmission power of the PRACH transmitted in the auxiliary serving cell is higher than a priority of transmission power of the PUCCH transmission in the primary serving cell, and the priority of transmission power of the PUCCH transmission in the primary serving cell is higher than a priority of transmission power of the PUSCH transmission that does not comprise any UCI in the primary serving cell.

14. The non-transitory computer-readable medium according to claim 13, wherein the computer instructions, when executed by the one or more hardware processors, further cause the one or more hardware processors to:

transmit a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled;

wherein the priority of transmission power of the PUSCH transmission that comprises the UCI is controlled to be equal to the priority of transmission power of the PUSCH transmitting the MSG3.

15. The non-transitory computer-readable medium according to claim 13, wherein the computer instructions, when executed by the one or more hardware processors, further cause the one or more hardware processors to:

transmit a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises the UCI, and a priority of transmission power of the PUSCH transmitting the MSG3 are controlled;

wherein the priority of transmission power of the PUSCH transmission that does not comprise any UCI is controlled to be lower than the priority of transmission power of the PUSCH transmission that comprises the UCI, the priority of transmission power of the PUSCH transmission that comprises the UCI is controlled to be lower than the priority of transmission power of the PUSCH transmitting the MSG3, and the priority of transmission power of the PUSCH transmitting the MSG3 is controlled to be lower than the priority of transmission power of the PUCCH.

16. The non-transitory computer-readable medium according to claim 13, wherein the computer instructions, when executed by the one or more hardware processors, further cause the one or more hardware processors to:

transmit a message 3 (MSG3) to a network side through a PUSCH in a contention-based random access procedure, wherein, when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled;

wherein the priority of transmission power of the PUSCH transmission that does not comprise any UCI is controlled to be lower than the priority of transmission power of the PUSCH transmitting the MSG3, the priority of transmission power of the PUSCH transmitting the MSG3 is controlled to be lower than the priority of transmission power of the PUSCH transmission that comprises the UCI, and the priority of transmission power of the PUSCH transmission that comprises the UCI is controlled to be lower than the priority of transmission power of the PUCCH.

17. The non-transitory computer-readable medium according to claim 13, wherein the computer instructions, when executed by the one or more hardware processors, further cause the one or more hardware processors to:

transmit a message 3 (MSG3) to a network side through a PUSCH in a contention-based random access procedure, wherein when power is limited, the priority of transmission power of the PUCCH, the priority of transmission power of the PUSCH transmission that does not comprise any UCI, a priority of transmission power of a PUSCH transmission that comprises UCI, and a priority of transmission power of the PUSCH transmitting the MSG3 are controlled;

wherein the priority of transmission power of the PUSCH transmission that does not comprise any UCI is controlled to be lower than the priority of transmission power of the PUSCH transmission that comprises the UCI, the priority of transmission power of the PUSCH transmission that comprises the UCI is controlled to be lower than the priority of transmission power of the PUCCH, and the priority of transmission power of the PUCCH is controlled to be lower than the priority of transmission power of the PUSCH transmitting the MSG3.

18. The non-transitory computer-readable medium according to claim 13, wherein the computer instructions, when executed by one or more hardware processors, cause the one or more hardware processors to:

transmit an MSG3 through an assigned uplink resource in a received random access response in a contention-based random access procedure.

* * * * *

UNITED STATES PATENT AND TRADEMARK OFFICE
CERTIFICATE OF CORRECTION

PATENT NO. : 10,299,217 B2
APPLICATION NO. : 15/424141
DATED : May 21, 2019
INVENTOR(S) : Yuhua Chen et al.

Page 1 of 1

It is certified that error appears in the above-identified patent and that said Letters Patent is hereby corrected as shown below:

In the Claims

In Column 9, Line 32, Claim 2, delete "transmitting the MSG" and insert --transmitting the $MSG_3$--

Signed and Sealed this
Second Day of July, 2019

Andrei Iancu
*Director of the United States Patent and Trademark Office*